United States Patent
Morinaga et al.

(10) Patent No.: US 8,400,597 B2
(45) Date of Patent: Mar. 19, 2013

(54) LIQUID CRYSTAL DISPLAY DEVICE

(75) Inventors: Junichi Morinaga, Osaka (JP);
Katsushige Asada, Osaka (JP);
Masahiro Yoshida, Osaka (JP); Tetsuya Fujikawa, Osaka (JP); Katsuhiro Mikumo, Osaka (JP); Kuniko Maeno, Osaka (JP); Ryohki Itoh, Osaka (JP);
Satoshi Horiuchi, Osaka (JP); Tatsuji Saitoh, Osaka (JP); Isao Ogasawara, Osaka (JP); Kazunori Tanimoto, Osaka (JP); Katsuhiro Okada, Osaka (JP);
Toshiaki Fujihara, Osaka (JP);
Masakatsu Tominaga, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 176 days.

(21) Appl. No.: 12/994,499

(22) PCT Filed: Mar. 27, 2009

(86) PCT No.: PCT/JP2009/056353
§ 371 (c)(1),
(2), (4) Date: Nov. 24, 2010

(87) PCT Pub. No.: WO2009/154031
PCT Pub. Date: Dec. 23, 2009

(65) Prior Publication Data
US 2011/0075087 A1 Mar. 31, 2011

(30) Foreign Application Priority Data
Jun. 20, 2008 (JP) .................. 2008-162464

(51) Int. Cl.
*G02F 1/1337* (2006.01)
*G02F 1/1343* (2006.01)

(52) U.S. Cl. .......... 349/129; 349/130; 349/139
(58) Field of Classification Search ............ 349/38, 349/39, 129, 130, 139
See application file for complete search history.

(56) References Cited

U.S. PATENT DOCUMENTS

| 6,225,967 | B1 | 5/2001 | Hebiguchi |
| 6,249,326 | B1 | 6/2001 | Hebiguchi |
| 6,313,898 | B1 | 11/2001 | Numano et al. |

(Continued)

FOREIGN PATENT DOCUMENTS

| CN | 101932970 A | 12/2010 |
| EP | 2 267 521 A1 | 12/2010 |

(Continued)

OTHER PUBLICATIONS

Russian Notice of Allowance for Application No. 2010150904 dated Jan. 11, 2012, with English translation.

*Primary Examiner* — Edward Glick
*Assistant Examiner* — David Chung
(74) *Attorney, Agent, or Firm* — Birch, Stewart, Kolasch & Birch, LLP

(57) ABSTRACT

Each of picture elements (14) has a plurality of alignment regions (R1, R2, R3, and R4), in each of which liquid crystal molecules contained in a liquid crystal layer are aligned in a direction that is different from those in the others of the plurality of alignment regions. Each of a plurality of scanning signal lines (32) and a border region (R11 and R12) between corresponding adjacent ones of the plurality of alignment regions (R1, R2, R3, and R4) at least partially overlap each other when viewed from above.

12 Claims, 5 Drawing Sheets

U.S. PATENT DOCUMENTS

| | | |
|---|---|---|
| 6,573,964 B1 | 6/2003 | Takizawa et al. |
| 2001/0048499 A1 | 12/2001 | Numano et al. |
| 2006/0146243 A1 | 7/2006 | Nakanishi et al. |
| 2007/0216838 A1 | 9/2007 | Hsu et al. |
| 2008/0002076 A1 | 1/2008 | Yagi et al. |
| 2008/0117373 A1* | 5/2008 | Sohn et al. .................... 349/143 |
| 2009/0225247 A1 | 9/2009 | Yagi et al. |
| 2009/0268116 A1 | 10/2009 | Yagi et al. |
| 2010/0165259 A1 | 7/2010 | Nakanishi et al. |
| 2010/0328558 A1 | 12/2010 | Asada et al. |
| 2012/0033160 A1* | 2/2012 | Tashiro et al. ................ 349/103 |

FOREIGN PATENT DOCUMENTS

| | | |
|---|---|---|
| JP | 11-167127 A | 6/1999 |
| JP | 2000-10119 A | 1/2000 |
| JP | 2000-193978 A | 7/2000 |
| JP | 2004-177384 A | 6/2004 |
| JP | 2006-189610 A1 | 7/2006 |
| JP | 2007-249202 A | 9/2007 |
| JP | 2007-298842 | 11/2007 |
| JP | 2008-116603 A | 5/2008 |
| RU | 94040148 A1 | 9/1996 |
| WO | WO 2006/064832 A1 | 6/2006 |

* cited by examiner

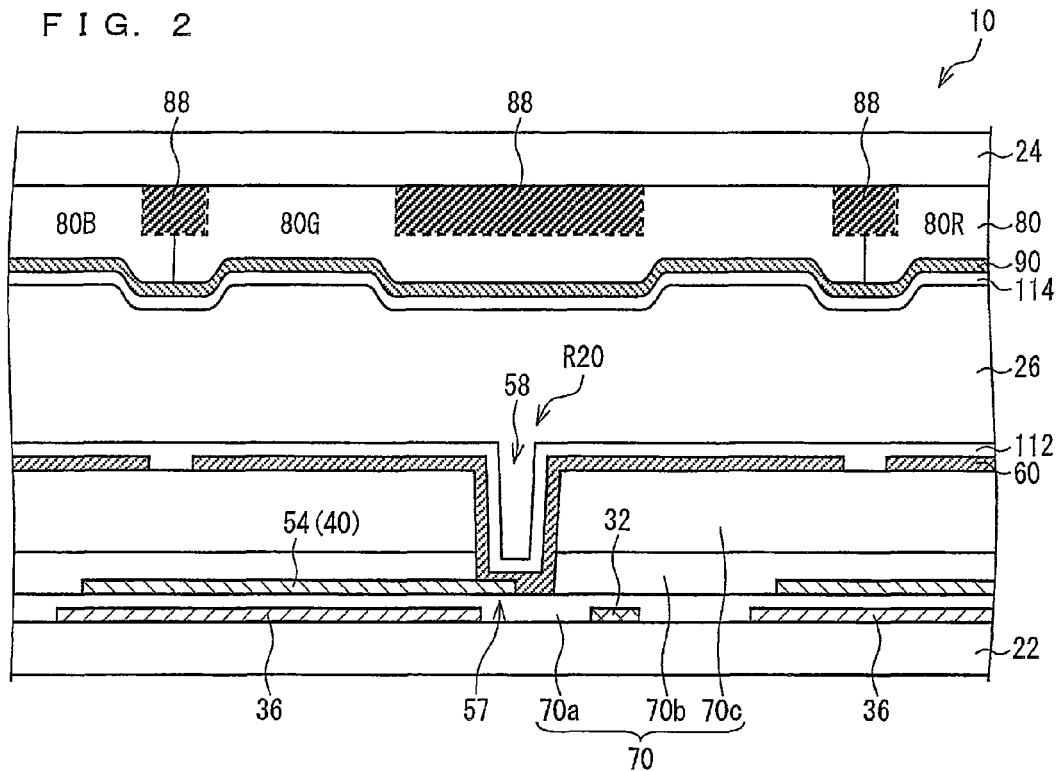
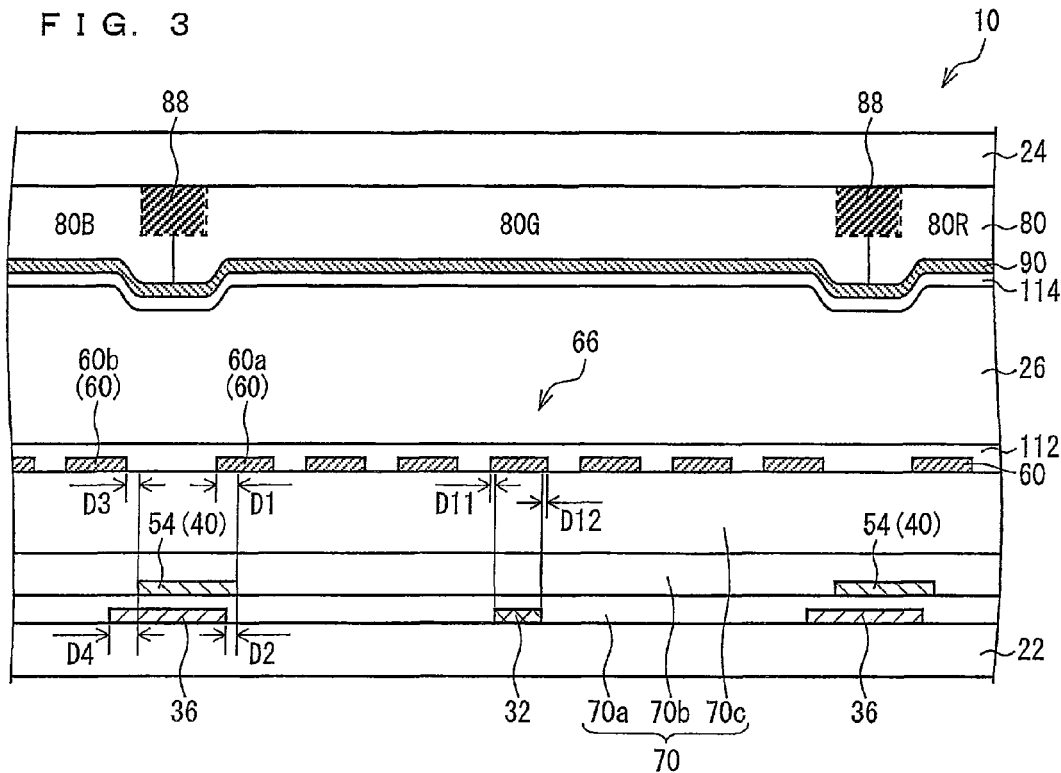

LIQUID CRYSTAL DISPLAY DEVICE

TECHNICAL FIELD

The present invention relates to a liquid crystal display device. The present invention particularly relates to a liquid crystal display device that includes so-called horizontally long picture element electrodes.

BACKGROUND ART

Conventionally, a liquid crystal display device has been widely used as a display device. In particular, an active matrix liquid crystal display device has been widely used as a display device.

The active matrix liquid crystal display device includes switching elements in its respective picture elements. The active matrix liquid crystal display device further includes a plurality of scanning signal lines and a plurality of image signal lines, which are provided so as to intersect each other to control the switching elements. The switching elements are provided at respective intersections of the plurality of scanning signal lines and the plurality of image signal lines. Further, there are provided picture element electrodes, which are connected with the respective switching elements, so as to correspond to the respective picture elements.

(Alignment Modes)

For such a liquid crystal display device, a variety of alignment modes of liquid crystal molecules have been proposed. The following description discusses the alignment modes of liquid crystal molecules.

For example, there have been proposed, as the alignment modes of liquid crystal molecules, (i) a TN (Twisted Nematic) mode in which an alignment direction of liquid crystal molecules near one of substrates is at an angle of approximately 90 degrees with an alignment direction of liquid crystal molecules near the other one of the substrates, (ii) a VA (Vertical Alignment) mode in which an alignment direction of liquid crystal molecules is almost perpendicular to the substrates, and (iii) the like.

Particularly in a case of the VA mode or the like, a plurality of alignment regions, i.e., multiple domains, can be made in each of picture elements so as to improve viewing angle dependence. In order to achieve the multiple domains, there have been proposed (i) a configuration in which each of picture element electrodes has slits that extend in a direction that is different from domain to domain and (ii) the like configuration.

For example, Patent Literature 1 describes a configuration in which each of subpixel electrodes (the picture element electrodes) has slits that extend in a plurality of different directions, thereby achieving a plurality of alignment regions.

(Vertically Long Picture Element Electrode)

The following description discusses a shape of each of the picture elements in the liquid crystal display device.

Generally, each of the picture elements has a vertically long shape. Accordingly, the picture element electrodes that correspond to the respective picture elements each have the vertically long shape. This will be described with reference to (a) of FIG. 8. (a) of FIG. 8 illustrates how picture elements 14 are arranged in a liquid crystal display device 10 that is capable of color display.

As illustrated in (a) of FIG. 8, in a case of color display, there are provided three types of picture elements 14: picture elements 14 that display R (red), picture elements 14 that display green (G), and picture elements 14 that display blue (B).

Each of the picture elements 14 that display R, each of the picture elements 14 that display G, and each of the picture elements that display B constitute a group. This group serves as a pixel 16.

In view of for example necessity of displaying a more natural image with respect to a viewer of the liquid crystal display device 10, the pixel 16 generally has a substantially square shape. On the other hand, in many cases, the liquid crystal display device 10 has a shape of horizontally long rectangle, therefore, each of the picture elements 14 has the vertically long shape so that a larger number of signal lines can be drawn toward a longer side of the rectangle.

Specifically, the pixel 16 is divided into three parts that are adjacent to one another in a horizontal direction, which three parts consist of a picture element 14 that displays R, a picture element 14 that displays G, and a picture element 14 that displays B, in such a manner that each of these picture elements 14 has the vertically long shape. This makes the pixel 16 correspond to (i) three of signal lines that extend in a vertical direction (i.e., a plurality of image signal lines 34) and (ii) one of signal lines that extend in a horizontal direction (i.e., a plurality of scanning signal lines 32). Accordingly, the number of signal lines that are drawn toward the longer side of the horizontally long rectangle is greater than the number of signal lines that are drawn toward a shorter side of the horizontally long rectangle.

Further, each of picture element electrodes 60 is provided over a substantially entire area of a corresponding one of the picture elements 14. Therefore, each of the picture element electrodes 60 also has the vertically long shape, which corresponds to the vertically long shape of the corresponding one of the picture elements 14.

(Horizontally Long Picture Element Electrode)

Besides the configuration in which the vertically long picture element electrodes 60 are provided, there has also been proposed a configuration in which horizontally long picture element electrodes 60 are provided. This configuration has been proposed for example to reduce power consumption by reducing the number of the plurality of image signal lines 34. This will be described below with reference to (b) of FIG. 8. (b) of FIG. 8 illustrates, as is the case with (a) of FIG. 8, how picture elements 14 are arranged in a liquid crystal display device 10 that is capable of color display.

As illustrated in (b) of FIG. 8, according to the liquid crystal display device 10 that includes the horizontally long picture element electrodes 60, a pixel 16 is divided into three parts that are adjacent to one another not in the horizontal direction but in a vertical direction. This makes the pixel 16 include three horizontally long picture elements 14, which consist of the picture element 14 that displays R, the picture element 14 that displays G, and the picture element 14 that displays B.

Since each of the picture elements 14 has the horizontally long shape, each of the picture element electrodes 60 also has the horizontally long shape, which corresponds to the horizontally long shape of each of the picture elements 14.

According to this configuration, although the number of horizontally-extended signal lines (i.e., a plurality of scanning signal lines 32) that correspond to the pixel 16 increases to three, the number of vertically-extended signal lines (i.e., a plurality of image signal lines 34) that correspond to the pixel 16 can be reduced to one. This makes it possible to reduce the number of drivers for the plurality of image signal lines 34, which drivers generally are more expensive to manufacture and consume more power than drivers for the plurality of scanning signal lines 32. As a result, it is possible to reduce power consumption and production costs.

In addition, the drivers for the plurality of scanning signal lines 32 each have a circuit configuration less complicated than that of the drivers for the plurality of image signal lines 34. Therefore, the circuit of each of the drivers for the plurality of scanning signal lines 32 can be provided, when the plurality of scanning signal lines 32 and the plurality of image signal lines 34 are formed, on a substrate on which the plurality of scanning signal lines 32 and the plurality of image signal lines 34 are provided, thereby further reducing the production costs. Further, since the drivers for the plurality of scanning signal lines 32 each have the circuit configuration less complicated than that of the drivers for the plurality of image signal lines 34, a driver mounting area can be reduced in its area size. This contributes to downsizing of the liquid crystal display device 10.

(Patent Literature 2)

The liquid crystal display device that includes the horizontally long picture element electrodes is described in for example Patent Literature 2. That is, Patent Literature 2 describes a liquid crystal display device that includes, for the purpose of reducing production costs and power consumption, picture element electrodes each of which is long in a direction in which scanning signal lines extend.

Citation List

Patent Literature 1

Japanese Patent Application Publication, Tokukai, No. 2006-189610 A (Publication Date: Jul. 20, 2006)

Patent Literature 2

Japanese Patent Application Publication, Tokukaihei, No. 11-167127 A (Publication Date: Jun. 22, 1999)

SUMMARY OF INVENTION

According to the conventional configuration as above, however, there is a problem in which a balance between (i) display quality and (ii) reducing of production costs by for example reducing the number of drivers is difficult to achieve.

That is, for example in a case where the liquid crystal display device of Patent Literature 1 is modified such that it includes, for the purpose of reducing production costs etc., the horizontally long picture element electrodes described in Patent Literature 2, the picture element electrodes are to be adjacent to each other via a scanning signal line.

According to such a liquid crystal display device, a deterioration in display quality is likely to occur particularly in the vicinities of the picture elements. This will be described below.

(Display Quality in the Vicinities of Picture Elements)

A deterioration in display quality in the vicinities of the picture elements is for example a flicker.

Generally, in order to reduce occurrence of a flicker etc., it is necessary to reduce, with respect to a sum of parasitic capacitances (Cpix) of a picture element electrode, parasitic capacitance (Cgd) formed between the picture element electrode and a scanning signal line that drives a picture element corresponding to the picture element electrode.

For example, when an electric potential of the scanning signal line is changed from (i) an electric potential at which a switching element connected with the picture element electrode is switched on to (ii) an electric potential at which the switching element is switched off, an electric potential of the picture element electrode changes by an amount that depends on (a) a magnitude of the Cgd with respect to that of the Cpix and (b) an amount of the change in the electric potential of the scanning signal line. Assume here that the liquid crystal display device is AC-driven for the purpose of preventing a deterioration in a liquid crystal material. In this case, if an absolute value of a voltage applied to liquid crystal is different between a case where an electric potential of the picture element electrode is positive with respect to that of a common electrode and a case where the electric potential of the picture element electrode is negative with respect to that of the common electrode, then a display abnormality such as a flicker or a brightness abnormality occurs. If that is the case, it is necessary to correct the electric potential of the picture element electrode by adjusting an image signal and/or the electric potential of the common electrode. Note however that it is difficult to appropriately correct the electric potential of the picture element electrode in cases where (1) the correction cannot be carried out for all gray scale levels, (2) the correction can be carried out only within a limited range due to voltage limit, and (3) the correction can be carried out only in fixed increments (e.g., in increments of 50 mV). In view of the circumstances, the Cgd is desired to be as small as possible so that a display defect can be prevented with only a small correction.

However, each of the horizontally long picture element electrodes is adjacent to corresponding ones of the scanning signal lines over a long distance, and therefore the Cgd tends to be large. In addition, generally, an amplitude of the electric potential of a scanning signal is greater than an amplitude of the electric potential of the picture element electrode. Therefore, the Cgd contributes to a problematic deterioration in display quality such deterioration as a flicker.

Further, according to the configuration in which the picture element electrodes are adjacent to each other via a corresponding one of the scanning signal lines, a deterioration in display quality is likely to occur not only when the electric potential is changed, but also while the electric potential is being kept constant. Specifically, an oblique electric field is likely to be generated between a picture element electrode and a scanning signal line that face each other, thereby causing a display unevenness (alignment abnormality) in a peripheral area of a picture element that corresponds to the picture element electrode. This alignment abnormality also becomes more problematic, because each of the horizontally long picture element electrodes is adjacent to corresponding ones of the plurality of scanning signal lines over a long distance.

The present invention has been made in view of the problems, and an object of the present invention is to provide a liquid crystal display device with high display quality, which (i) includes less drivers for liquid crystal, (ii) requires less mounting costs, and (iii) can be manufactured at low cost.

Further, an object of the present invention is to provide a liquid crystal display device that is excellent in a viewing angle characteristic and has high aperture ratio.

In order to attain the above objects, a liquid crystal display device in accordance with the present invention includes: a first substrate; a second substrate; and a liquid crystal layer provided between the first substrate and the second substrate, picture elements being provided in a matrix manner, the first substrate being provided with: a plurality of scanning signal lines; a plurality of image signal lines which are provided so as to intersect the plurality of scanning signal lines; a plurality of switching elements each of which is electrically connected with a corresponding one of the plurality of scanning signal lines and electrically connected with a corresponding one of the plurality of image signal lines; and picture element electrodes which are provided so as to correspond to the respective picture elements and so as to be electrically connected with the respective switching elements, the second substrate being provided with a common electrode, each of the picture element electrodes having (i) a first side that extends in a direction in which a corresponding one of the plurality of scanning signal lines extends and (ii) a second side that extends in a direction in which a corresponding one of the plurality of image signal lines extends, the first side being longer than the second side, each of the picture elements having a plurality of alignment regions, in each of which liquid crystal molecules contained in the liquid crystal layer are aligned in a direction that is different from those in the others of the plurality of alignment regions, and (i) each of the plurality of scanning signal lines and (ii) a border region between corresponding adjacent ones of the plurality of alignment regions at least partially overlap each other when viewed from above.

This configuration makes it possible to achieve a liquid crystal display device with high aperture ratio, high brightness, and high display quality.

That is, in the border region between corresponding adjacent ones of the plurality of alignment regions, the liquid crystal molecules are likely to be aligned disorderly. As a result, the border region is inferior in display quality in many cases.

Meanwhile, the plurality of scanning signal lines are generally made of metal. Accordingly, regions in which the plurality of scanning signal lines are provided when viewed from above (i) have light transmittance lower than that of other regions or (ii) transmit no light.

In this regard, according to the liquid crystal display device configured as above, each of the plurality of scanning signal lines overlaps, when viewed from above, the border region between the corresponding adjacent ones of the plurality of alignment regions. Accordingly, the configuration makes it possible to hide, when the picture elements are viewed from above, regions of the picture elements which regions are inferior in display quality. Further, the configuration makes it possible to suppress a reduction in aperture ratio, which reduction results from provision of the plurality of scanning signal lines.

As such, the configuration makes it possible to suppress such reduction in aperture ratio in a liquid crystal display device that has a plurality of alignment regions. This makes it possible to achieve a display with high aperture ratio, high brightness, and high display quality.

Further, according to the configuration, (i) each of the plurality of scanning signal lines and (ii) the border region between corresponding adjacent ones of the plurality of alignment regions in each of the picture elements overlap each other when viewed from above. In other words, each of the plurality of scanning signal lines extends, when viewed from above, through corresponding ones of the picture elements.

As described earlier, in a configuration in which a scanning signal line is provided between any of respective adjacent picture elements, a transverse electric field is generated between the scanning signal line and corresponding picture element electrodes. In this regard, according to the configuration, it is possible to prevent a reduction in display quality, which reduction results from for example such a traverse electric field.

Further, according to the configuration, each of the picture element electrodes has (i) the first side that extends in the direction in which the corresponding one of the plurality of scanning signal lines extends and (ii) the second side that extends in the direction in which the corresponding one of the plurality of image signal lines extends, the first side being longer than the second side. In other words, each of the picture element electrodes has a configuration of a so-called horizontally long picture element electrode. This configuration makes it possible, as described earlier, to reduce the number of the plurality of image signal lines.

Accordingly, it is possible to reduce the number of drivers for the plurality of image signal lines, which drivers generally consume much power and are expensive to manufacture. As a result, it is possible to achieve a liquid crystal display device that includes less drivers and requires less mounting costs and therefore is inexpensive to manufacture and consumes less power.

Further, according to the configuration, each of the picture elements has the plurality of alignment regions, in each of which the liquid crystal molecules are aligned in the direction that is different from those in the others of the plurality of alignment regions. This makes it possible to provide a stable display at any viewing angle, thereby making it possible to achieve a liquid crystal display device that is excellent in a viewing angle characteristic.

As so far described, according to the configuration, it is possible to achieve a liquid crystal display device with high display quality, which (i) includes less drivers for liquid crystal, (ii) requires less mounting costs, and (iii) can be manufactured at low cost. Further, with the configuration, it is possible to achieve a liquid crystal display device that is excellent in a viewing angle characteristic and has high aperture ratio.

The liquid crystal display device in accordance with the present invention is preferably configured such that the first substrate is further provided with: storage capacitor lines which are provided so as to extend in a direction parallel to the direction in which the plurality of scanning signal lines extend, a major part of each of the storage capacitor lines is provided between corresponding adjacent ones of the picture element electrodes, the corresponding adjacent ones of the picture element electrodes being adjacent to each other in a direction in which the plurality of image signal lines extend, and said each of the storage capacitor lines and the corresponding adjacent ones of the picture element electrodes at least partially overlapping one another via an insulation film when viewed from above.

According to the configuration, it is possible to further improve display quality.

That is, generally, an area between any of respective adjacent ones of the picture element electrodes is inferior in display quality. In this regard, according to the configuration, each of the storage capacitor lines, which are generally made of metal that has a light-shielding property, is provided in the area between the adjacent ones of the picture element electrodes.

In this way, the area that is inferior in display quality is hidden. Accordingly, it is possible to prevent a reduction in display quality.

The liquid crystal display device in accordance with the present invention is preferably configured such that the first substrate is further provided with: connection electrodes via which the plurality of switching elements are electrically connected with the respective picture element electrodes, the connection electrodes and the respective storage capacitor lines at least partially overlapping each other via the insulation film when viewed from above.

According to the configuration, in an area between any of respective adjacent ones of the picture element electrodes, a corresponding one of the storage capacitor lines overlaps a corresponding one of the connection electrodes each of which extends from a corresponding one of the plurality of switching elements.

Accordingly, it is possible to form a storage capacitor by the corresponding one of the storage capacitor lines and the corresponding one of the connection electrodes, without largely reducing aperture ratio.

Further, particularly in a case where for example (i) the plurality of switching elements are transistor elements and (ii) each of the connection electrodes extends from a drain electrode of a corresponding one of the transistor elements, it is possible to easily carry out a disconnection test.

That is, although disconnection of a bus line etc. can be detected relatively easily by a continuity test etc., disconnection of a wire that extends from a corresponding one of the transistor elements cannot be detected without a test of higher level such as pseudo lighting.

In this regard, according to the configuration, there is no need to unduly lengthen connection wires so as to obtain a storage capacitance of desired level. This makes it possible to detect disconnection by an easy test. Further, it is possible to prevent a reduction in yield.

The liquid crystal display device in accordance with the present invention is preferably configured such that, in areas where the connection electrodes and the respective storage capacitor lines overlap each other when viewed from above, the connection electrodes and respective reference picture element electrodes overlap each other via the insulation film when viewed from above, the reference picture element electrodes being ones which are connected with the respective connection electrodes, (i) the storage capacitor lines and (ii) the respective reference picture element electrodes and the respective neighboring picture element electrodes overlap each other via the insulation film when viewed from above, the connection electrodes are provided in a layer which is closer to the reference picture element electrodes than a layer in which the storage capacitor lines are provided is; and areas where the connection electrodes and the reference picture element electrodes overlap each other is larger than areas where the storage capacitor lines and the reference picture element electrodes overlap each other.

According to the configuration, each of the reference picture element electrodes is less affected by a corresponding one of the storage capacitor lines. That is, according to the configuration, the connection electrodes are provided in the layer which is closer to the reference picture element electrodes than the layer in which the storage capacitor lines are provided is, and the areas where the connection electrodes and the reference picture element electrode overlap each other is larger than areas where the storage capacitor lines and the reference picture element electrode overlap each other.

The connection electrodes provided between the storage capacitor lines and the reference picture element electrodes are likely to function as plates that shield against an electric field.

Accordingly, the configuration makes it possible to prevent the reference picture element electrodes from receiving an electromagnetic effect of the storage capacitor lines. This makes it possible to suppress a reduction, in display quality, which results from the effect of the storage capacitor lines.

The liquid crystal display device in accordance with the present invention is preferably configured such the first substrate is further provided with: connection electrodes via which the plurality of switching elements are electrically connected with the respective picture element electrodes, the plurality of alignment regions whose total number is four being provided in each of the picture elements so as to be divided into (i) first two regions adjacent to each other in a direction parallel to the direction in which the plurality of scanning signal lines extend and (ii) second two regions adjacent to each other in a direction parallel to the direction in which the plurality of image signal lines, and each contact hole for electrically connecting a corresponding one of the connection electrodes with a corresponding one of the picture element electrodes being provided in an area of a corresponding one of the picture elements, in which area (i) two border regions each between two alignment regions which are adjacent to each other in the direction in which the plurality of scanning lines extend and (ii) two border regions each between two alignment regions which are adjacent to each other in the direction in which the plurality of image signal lines extend intersect each other.

According to the configuration, each picture element has four alignment regions: two in one direction and two in another direction that is substantially orthogonal to the one direction. This makes it possible to achieve a wider viewing angle.

Further, according to the configuration, the contact hole is in the intersection, in which generally the liquid crystal molecules are disorderly aligned and which is inferior in display quality. Therefore, even if the contact hole, which does not contribute to display, is provided in a corresponding one of the picture elements, display brightness is not so much reduced.

The liquid crystal display device in accordance with the present invention is preferably configured such that the each contact hole and a corresponding one of the plurality of scanning signal lines do not overlap each other when viewed from above.

The configuration makes it possible to suppress occurrence of a short circuit failure in the vicinity of the contact hole.

That is, the contact hole is for connecting each of the connection electrodes with a corresponding one of the picture element electrodes.

Under the circumstances, particularly in a case where the each of the connection electrodes serves as a counter electrode for a corresponding one of the storage capacitor lines, the storage capacitor line needs to be provided so that the storage capacitor line and the connection electrode substantially overlap each other but are in respective different layers. On the other hand, the storage capacitor lines and the plurality of scanning signal lines are provided in a single layer.

In this regard, according to the configuration, each contact hole and a corresponding one of the plurality of scanning signal lines do not overlap each other when viewed from above. Accordingly, it is possible to provide the storage capacitor lines so as to form storage capacitors by the storage capacitor lines and the connection electrodes, while suppressing occurrence of a short circuit failure in the vicinity of the contact hole, which failure occurring between a corresponding one of the plurality of scanning signal lines and a corresponding one of the storage capacitor lines.

Further, in a region where the contact hole is provided, a corresponding one of the connection electrodes and a corresponding one of the picture element electrodes are provided. Under the circumstances, if a corresponding one of the scanning signal line is provided near the contact hole, a Cgd may be enhanced, thereby causing a deterioration in display quality.

The liquid crystal display device in accordance with the present invention is preferably configured such that the second substrate is further provided with: a black matrix, the contact holes being covered by the black matrix when viewed from above.

According to the configuration, the contact hole, which does not contribute to a display, is covered by the black matrix. This makes it possible to provide the contact hole in each of the picture elements, while suppressing a reduction in display quality.

The liquid crystal display device in accordance with the present invention is preferably configured such that a major part of each of the connection electrodes is provided between corresponding adjacent ones of the picture element electrodes, the corresponding adjacent ones of the picture element electrodes being adjacent to each other in a direction in which the plurality of image signal lines extend; and each of the connection electrodes extends from an area between corresponding adjacent ones of the picture element electrodes to the contact hole, when viewed from above, via a corresponding one of the two border regions each between the two alignment regions which are adjacent to each other in the direction in which the plurality of scanning lines extend.

According to the configuration, each of the connection electrodes extends from the area between corresponding adjacent ones of the picture elements to the contact hole via the two border regions each between the two alignment regions.

That is, a wire having a light-shielding property is provided in a region that is inferior in display quality as described earlier. Accordingly, it is possible to provide desired wires while suppressing a reduction in display brightness.

The liquid crystal display device in accordance with the present invention is preferably configured such that each of the picture element electrodes has at least two slits in each of the plurality of alignment regions; a direction in which said at least two slits extend differs from alignment region to alignment region; and said at least two slits of said each of the picture element electrodes extend in an identical direction in each of the plurality of alignment regions.

According to the configuration, each of the picture element electrodes has slits. Accordingly, it is possible to easily control alignment of the liquid crystal molecules in each of the plurality of alignment regions.

The liquid crystal display device in accordance with the present invention is preferably configured such that each of the picture element electrodes has, in each of the plurality of alignment regions, a comb-teeth shape since it has said at least two slits; said each of the picture element electrodes has a main line region via which branch line regions in the plurality of alignment regions are electrically connected with one another; and the main line region and a corresponding one of the plurality of scanning signal lines at least partially overlap each other via the insulation film when viewed from above.

The liquid crystal display device in accordance with the present invention is preferably configured such that the corresponding one of the plurality of scanning signal lines is covered by the main line region when viewed from above.

According to the configuration, each of the plurality of scanning signal lines overlaps the main line region of a corresponding one of the picture element electrodes. Therefore, the main line region is likely to shield the liquid crystal molecules in a corresponding one of the picture elements against an effect of an electric filed that is from the each of the plurality of scanning signal lines. Accordingly, it is possible to achieve high quality display.

Further, in a case where each of the plurality of scanning signal lines is covered by the main line region when viewed from above, the electric field is more likely to be blocked. This makes it possible to achieve display with higher quality.

The liquid crystal display device in accordance with the present invention is preferably configured such that the second substrate is further provided with: columnar spacers, for keeping a gap between the first substrate and the second substrate, which are provided so that the columnar spacers and the picture element electrodes do not overlap one another when viewed from above.

According to the configuration, spacers, which may contribute to reduction in aperture ratio, are provided in a region in which no picture element electrode is provided and which does not contribute to a display.

Accordingly, it is possible to provide the spacers while suppressing a reduction in display brightness.

As so far described, the liquid crystal display device in accordance with the present invention is configured such that (i) each of picture elements has a plurality of alignment regions, in each of which liquid crystal molecules contained in a liquid crystal layer are aligned in a direction that is different from those in the others of the plurality of alignment regions, and (ii) each of a plurality of scanning signal lines and a border region between corresponding adjacent ones of the plurality of alignment regions at least partially overlap each other when viewed from above.

Accordingly, it is possible to achieve a liquid crystal display device with high display quality, which (i) includes less drivers for liquid crystal, (ii) requires less mounting costs, and (iii) can be manufactured at low cost.

BRIEF DESCRIPTION OF DRAWINGS

FIG. 1, which shows an embodiment of the present invention, is a view schematically illustrating how a liquid crystal display device is configured.

FIG. 2

FIG. 2 is a cross-sectional view taken along line A-A of FIG. 1.

FIG. 3

FIG. 3 is a cross-sectional view taken along line B-B of FIG. 1.

FIG. 4, which shows another embodiment of the present invention, is a view schematically illustrating how a liquid crystal display device is configured.

FIG. 5, which shows a further embodiment of the present invention, is a view schematically illustrating how a liquid crystal display device is configured.

FIG. 6, which shows still a further embodiment of the present invention, is a view schematically illustrating how a liquid crystal display device is configured.

FIG. 7, which shows still yet a further embodiment of the present invention, is a view schematically illustrating how a liquid crystal display device is configured.

Figure 8:
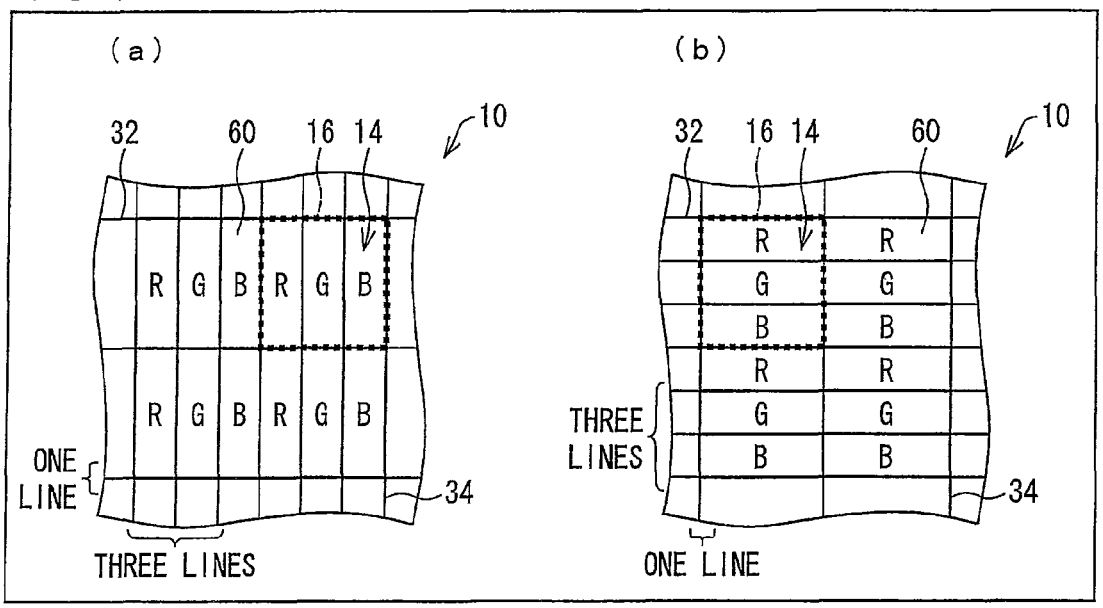
FIG. 8

(a) and (b) of FIG. 8 are views illustrating how picture element electrodes are arranged. (a) of FIG. 8 is for a case where the picture element electrodes each have a vertically long shape. (b) of FIG. 8 is for a case where the picture element electrodes each have a horizontally long shape.

REFERENCE SIGNS LIST

10 Liquid Crystal Display Device
14 Picture Element
16 Pixel
22 First Substrate
24 Second Substrate
26 Liquid Crystal Layer 32 Scanning Signal Line
34 Image Signal Line
36 Storage Capacitor Line
50 Switching Element
54 Connection Electrode
58 Contact Hole
60 Picture Element Electrode
60a Reference picture element Electrode
60b Neighboring Picture Element Electrode
62 Slit
64 Branch Line Region
66 Main Line Region
66a First Main Line Region (Main Line Region)
66b Second Main Line Region (Main Line Region)
66c Third Main Line Region (Main Line Region)
66d Fourth Main Line Region (Main Line Region)
70 Insulation Film
90 Common Electrode
R1 First Alignment Region (Alignment Region)
R2 Second Alignment Region (Alignment Region)
R3 Third Alignment Region (Alignment Region)
R4 Fourth Alignment Region (Alignment Region)
R11 First Border Region (Border Region)
R12 Second Border Region (Border Region)
R13 Third Border Region (Border Region)
R14 Fourth Border Region (Border Region)
R20 Border Central Region (Intersection)
Direction Indicated by Arrow X (Direction in Which Scanning Signal Line Extends)
Direction Indicated by Arrow Y (Direction in Which Image Signal Line Extends)

DESCRIPTION OF EMBODIMENTS

Embodiment 1

Figure 1:
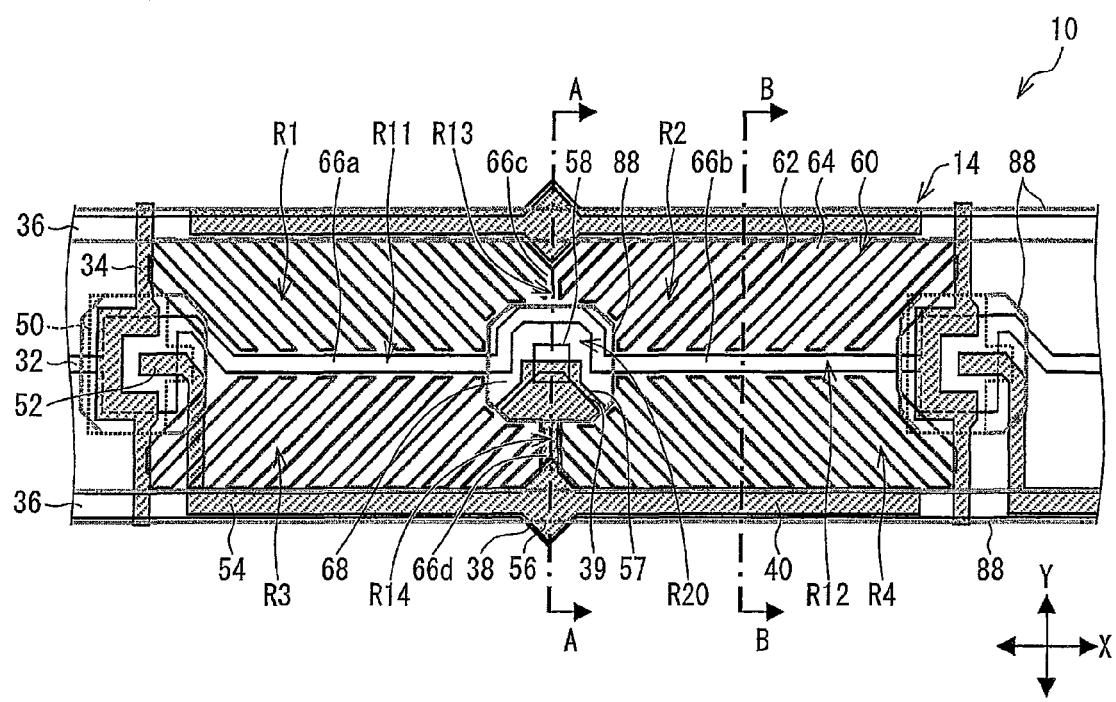
FIG. 1

An embodiment of the present invention is described below with reference to the drawings.
(Schematic Configuration of Picture Element)
FIG. 1 is a view schematically illustrating how a liquid crystal display device 10 of the present embodiment is configured.
As illustrated in FIG. 1, the liquid crystal display device 10 of the present embodiment is a so-called active matrix liquid crystal display device 10. As described earlier, the liquid crystal display device 10 includes switching elements 50 in respective picture elements 14. Specifically, TFT (Thin Film Transistor) elements, which serve as the switching elements 50, are provided in the respective picture elements 14.
Further, for the purpose of controlling the switching elements 50, there are provided a plurality of scanning signal lines 32 and a plurality of image signal lines 34 so that they intersect each other. The switching elements 50 are provided at respective intersections of the plurality of scanning signal lines 32 and the plurality of image signal lines 34.
Further, a plurality of storage capacitor lines 36 are provided in parallel with the plurality of scanning signal lines 32.
Each of the plurality of image signal lines 34 and a corresponding one of the plurality of storage capacitor lines 36 define a region which is in a substantially rectangular shape. Such a region corresponds to a picture element 14. A corresponding picture element electrode 60 is provided in such a region. That is, according to the present embodiment, each of the picture elements 14 does not correspond to a region which is defined by a corresponding one of the plurality of image signal lines 34 and a corresponding one of the plurality of scanning signal lines 32. Namely, each of the plurality of scanning signal lines 32 is provided so as to extend through and drive corresponding ones of the picture elements 14.

Specifically, the each of the plurality of scanning signal lines 32 is substantially centrally-provided between corresponding adjacent ones of the plurality of storage capacitor lines 36. That is, the each of the plurality of scanning signal lines 32 is provided so as to extend (i) through a substantially central part of the corresponding one of the picture elements 14 in a direction in which the corresponding one of the plurality of image signal lines 34 extends (i.e., in a direction indicated by an arrow Y shown in FIG. 1 [i.e., in a vertical direction]) and (ii) in parallel with a direction in which the corresponding one of the plurality of storage capacitor lines 36 extends (i.e., in a direction indicated by an arrow X shown in FIG. 1 [i.e., in a horizontal direction]).
(Horizontally Long Picture Element)
The picture element electrodes 60 in accordance with the present embodiment each have a horizontally long shape.
Specifically, according to the liquid crystal display device 10 of the present embodiment, the plurality of scanning signal lines 32 and the plurality of storage capacitor lines 36 are provided so as to extend in the horizontal direction (i.e., in the direction indicated by the arrow X), whereas the plurality of image signal lines 34 are provided so as to extend in the vertical direction (i.e., in the direction indicated by the arrow Y). In a relation between a corresponding one of the plurality of storage capacitor lines 36 and a corresponding one of the plurality of image signal lines 34, by which each of the picture elements 14 is defined, a distance between the corresponding one of the plurality of image signal lines 34 and its adjacent image signal line 34 is longer than a distance between the corresponding one of the plurality of storage capacitor lines 36 and its adjacent storage capacitor line 36.
Accordingly, each of the picture elements 14, which is substantially defined by a corresponding one of the plurality of storage capacitor lines 36 and a corresponding one of the plurality of image signal lines 34, has a horizontally long shape. This causes each of the picture element electrodes 60 to have the horizontally long shape as a whole.
(Alignment Region)
The following description more specifically discusses, with reference to FIG. 1, how each of the picture elements 14 is configured.
The liquid crystal display device 10 of the present embodiment has, in each of the picture elements 14, a plurality of alignment regions. Note here that each of the plurality of alignment regions stands for a region in which liquid crystal molecules contained in a liquid crystal layer are oriented in a substantially identical direction. That is, the liquid crystal display device 10 of the present embodiment has, in each of the picture elements 14, a plurality of regions whose orientation directions are different from each other. This will be specifically described below.
According to the liquid crystal display device 10 of the present embodiment, each of the picture elements 14 is divided into four alignment regions (i.e., alignment regions R1, R2, R3, and R4).
Specifically, each of the horizontally long picture elements 14 is almost evenly divided into (i) two alignment regions that are adjacent to each other in a direction (i.e., in the direction indicated by the arrow X) in which long sides of the picture element 14 extend (such a direction is hereinafter referred to as a long side direction) and (ii) two alignment regions that are adjacent to each other in a direction (i.e., in the direction indicated by the arrow Y) in which short sides of the picture element 14 extend.

That is, in each of the picture elements 14, the alignment regions R1 and R2 are adjacent to each other in the long side direction, and the alignment regions R3 and R4 are adjacent to each other in the long side direction.

Similarly, in the picture element 14, the alignment regions R1 and R3 are adjacent to each other in the short side direction, and the alignment regions R2 and R4 are adjacent to each other in the short side direction.

(Border Region)

Since each of the picture elements 14 is divided into the four alignment regions as above, the picture element 14 has four border regions, i.e., a border region formed between any of respective adjacent two of the four alignment regions.

Specifically, as illustrated in FIG. 1, there are two of the four border regions that extend in the long side direction, i.e., (i) a first border region R11 formed between the alignment region R1 and the alignment region R3 and (ii) a second border region R12 formed between the alignment region R2 and the alignment region R4.

On the other hand, there are the other two of the four border regions that extend in the short side direction, i.e., (iii) a third border region R13 formed between the alignment region R1 and the alignment region R2 and (iv) a fourth border region R14 between the alignment region R3 and the alignment region R4.

The border regions intersect each other in a central region (intersection region) of each of the picture elements 14. In other words, the central region is a border central region R20 in which the alignment regions are adjacent to one another.

Generally, the liquid crystal molecules are likely to be oriented disorderly in each of the four border regions and the border central region. This is likely to cause a deterioration in display quality. In view of the circumstances, it is preferable that each of the four border regions and the border central region block the light by use of light-shielding materials such as metal wires or black matrices (later described).

(Picture Element Electrode)

The following description discusses a picture element electrode 60.

According to the liquid crystal display device 10 of the present embodiment, the plurality of alignment regions are formed by configuring the picture element electrode 60 such that the shape of the picture element electrode 60 differs from alignment region to alignment region in the picture element 14.

Specifically, according to the liquid crystal display device 10 of the present embodiment, the picture element electrode 60 has a so-called comb-teeth shape (see FIG. 1). In each of the picture elements 14, there are provided regions in each of which a direction in which the comb teeth extend is different.

(Branch Line Region)

Specifically, the picture element electrode 60 has a plurality of missing parts, which serve as slits 62. The slits 62 in each of the four alignment regions extend in parallel with one another in an identical direction, which direction differs from alignment region to alignment region.

Accordingly, each of (i) an electric field and (ii) a voltage which are applied to the liquid crystal molecules differs from alignment region to alignment region. This causes orientation directions of the liquid crystal molecules to differ from alignment region to alignment region.

More specifically, the slits 62 in the first alignment region R1 and the fourth alignment region R4 are at an angle of approximately −45 degrees with the direction indicated by the arrow X. On the other hand, the slits 62 in the second alignment region R2 and the third alignment region R3 are at an angle of approximately +45 degrees with the direction indicated by the arrow X.

(Main Line Region)

Since the picture element electrode 60 has the slits 62, the picture element electrode 60 has thin-line shaped electrodes that result from the slits 62. The thin-line shaped electrodes are branch line regions 64, which are electrically connected with one another via main line regions 66.

Specifically, the main line regions 66 are provided in the respective border regions. Not only a plurality of branch line regions 64 that belong to their alignment region are connected with one another by the main line regions 66, but also branch line regions 64 of groups that belong to the respective alignment regions are connected with one another by the main line regions 66. This allows all the branch line regions 64 to have an identical electric potential irrespective of which alignment region they belong to. It follows that the picture element electrode 60 in each of the picture elements 14, as a whole, has an identical electric potential.

As described above, the main line regions 66 are provided in a border region between any of respective adjacent two of the alignment regions. That is, a range in which the border regions and the border central region are provided is substantially identical to a range in which the main line regions 66 are provided. In other words, the main line regions 66 in each of the picture elements 14 are arranged substantially crisscross.

Specifically, branch line regions 64 that belong to the first alignment region R1 are connected with branch line regions 64 that belong to the third alignment region R3, via a first main line region 66a that extends in the direction indicated by the arrow X. Similarly, branch line regions 64 that belong to the second alignment region R2 are connected with branch line regions 64 that belong to the fourth alignment region R4, via a second main line region 66b that extends in the direction indicated by the arrow X.

Further, the branch line regions 64 that belong to the first alignment region R1 are connected with the branch line regions 64 that belong to the second alignment region R2, via a third main line region 66c that extends in the direction indicated by the arrow Y. Similarly, the branch line regions that belong to the third alignment region R3 are connected with the branch line regions 64 that belong to the fourth alignment region R4, via a fourth main line region 66d that extends in the direction indicated by the arrow Y.

(Central Connection Region)

The following description discusses how the picture element electrode 60 is shaped in the border central region R20 where the border regions intersect each other.

According to the present embodiment, the picture element electrode 60 has, in its border central region R20, a solid region that has no slit 62. The solid region is a central connection region 68.

In the central connection region 68, for example, the picture element electrode 60 is connected with a wire that extends from a corresponding switching element 50. This will be described later.

(Positional Relation Among Wires)

The following description discusses how wires are arranged in the liquid crystal display device 10 of the present embodiment.

(Scanning Signal Line)

First, the following description discusses a scanning signal line 32. As described earlier, each of the scanning signal lines 32 is provided so as to extend through corresponding ones of the picture elements 14 that are driven by the each of the scanning signal lines 32.

Specifically, according to the present embodiment, each TFT (Thin Film Transistor) element, which serves as a switching element 50, is provided in a corresponding one of the picture elements 14 so as to be in a substantially central part of a peripheral part of the corresponding one of the picture elements 14, which peripheral part extends in the vertical direction. In other words, each switching element 50 is provided in a substantially central part of a short side of the corresponding one of the picture elements 14, which has a horizontally long rectangular shape.

The scanning signal line 32 extends in the horizontal direction, via the switching element 50, so as to pass through a central part of the short side of the picture element 14.

Note here that, as described earlier, according to the liquid crystal display device 10 of the present embodiment, each of the picture elements 14 is almost evenly divided into (i) two alignment regions that are adjacent to each other in the long side direction (i.e., in the direction indicated by the arrow X) and (ii) two alignment regions that are adjacent to each other in the short side direction (i.e., the direction indicated by the arrow Y). Accordingly, each of the scanning signal lines 32 overlaps, when viewed from above, corresponding ones of the border regions each of which is formed between any of respective adjacent two of the four alignment regions.

Specifically, due to the relation between (i) the scanning signal line 32 and (ii) the corresponding ones of the border regions, most of the scanning signal line 32 and each of the first border region R11 and the second border region R12 overlap each other. On the other hand, due to the relation between (i) the scanning signal line 32 and (ii) the picture element electrode 60, the scanning signal line 32 and the main line regions 66 mainly overlap each other when viewed from above.

Specifically, the scanning signal line 32 is provided (i) between the first alignment region R1 and the third alignment region R3 and (ii) between the second alignment region R2 and the fourth alignment region R4. Accordingly, (a) the scanning signal line 32 and (b) each of the first main line region 66a and the second main line region 66b, which are ones of the main line regions 66 and extend in the direction indicated by the arrow X, overlap each other. Further, the scanning signal line 32 and the central connection region 68, which is located between the first main line region 66a and the second main line region 66b, overlap each other.

More specifically, according to the liquid crystal display device 10 of the present embodiment, each of the main line regions 66 is greater in width than the scanning signal line 32.

Further, when viewed from above, the scanning signal line 32 is covered by the main line regions 66 and the central connection region 68.

With the configuration, it is possible for a liquid crystal layer to be less affected by a signal (an electric potential) which is applied to the scanning signal line 32. This is because, since the picture element electrode 60 (i.e., the main line regions 66 and the central connection region 68) is provided between the scanning signal line 32 and the liquid crystal layer, the liquid crystal layer is blocked from being affected by the scanning signal line 32.

Further, the scanning signal line 32 has a substantially U-shaped bent part, when viewed from above, in a region in which the scanning signal line 32 and the central connection region 68 overlap each other. This is mainly because the U-shaped bent part allows the scanning signal line 32 to bypass a contact hole 58 which is provided in the central connection region 68.

The contact hole 58 causes the switching element 50 to electrically connect with the picture element electrode 60 (later described in detail). Specifically, the switching element 50 is connected with the picture element electrode 60, via a connection electrode 54 that extends from the switching element 50.

The connection electrode 54 serves also as a storage capacitor counter electrode 40. Therefore, an insulation film 70 is provided between the connection electrode 54 and a storage capacitor line 36 which is provided in a layer which is different from a layer in which the insulation film 70 is provided, so that the connection electrode 54 and the storage capacitor line 36 substantially overlap each other. This causes a storage capacitor to be formed by the connection electrode 54 and the storage capacitor line 36.

Note here that the storage capacitor line 36 and the scanning signal line 32 are generally provided in a single layer. It is therefore necessary to prevent for example a short circuit between the scanning signal line 32 and the storage capacitor line 36 from occurring in the vicinity of the contact hole 58. On this account, the scanning signal line 32 is bent in substantially the U shape so as to bypass the contact hole 58.

(Connection Electrode)

Next, the following description discusses the connection electrode 54. The connection electrode 54 refers to an electrode via which the switching element 50 is electrically connected with the picture element electrode 60.

According to the liquid crystal display device 10 of the present embodiment, the connection electrode 54 serves also as the storage capacitor counter electrode 40. The storage capacitor counter electrode 40 refers to, as described earlier, an electrode that causes the storage capacitor to be formed by the electrode and the storage capacitor line 36. This will be specifically described below.

The connection electrode 54 has one end that is connected with a drain electrode 52 of the TFT element (i.e., the switching element 50). Note here that, according to the liquid crystal display device 10 of the present embodiment, the switching element 50 is provided in the central part of the short side of one of two picture elements 14 which are adjacent to each other in the direction indicated by the arrow Y. Therefore, the connection electrode 54 first extends in the direction indicated by the arrow Y (i.e., in the vertical direction) so as to be directed toward an area between the two picture elements 14 which are adjacent to each other in the direction indicated by the arrow Y.

Note here that, as described earlier, the storage capacitor line 36 is provided between the adjacent picture elements 14 so as to extend in the direction indicated by the arrow X.

The connection electrode 54, which is thus directed toward the area between the adjacent picture elements 14, extends in the direction indicated by the arrow X such that the connection electrode 54 and the storage capacitor line 36 overlap each other when viewed from above. A part of the entire connection electrode 54, in which the part and the storage capacitor line 36 overlap each other when viewed from above, serves as the storage capacitor counter electrode 40.

The storage capacitor is formed by the storage capacitor line 36 and the storage capacitor counter electrode 40.

The connection electrode 54, which serves as the storage capacitor counter electrode 40, extends between the adjacent picture elements 14 substantially throughout the long side of the picture element 14 which is in the horizontally long rectangular shape.

(Extension in Y Direction)

Next, the following description discusses a part, of the connection electrode 54, which extends from the central part of the long side (peripheral part) of the picture element 14 toward a central part of the picture element 14.

That is, each connection electrode 54 between adjacent picture elements 14 extends, in the direction indicated by the arrow Y, from a central part of a long side of a corresponding one of the adjacent picture elements 14 toward a central part of the corresponding one of the adjacent picture elements 14.
(First Wide Part)

The connection electrode 54 is widened in its bifurcation where the connection electrode 54, which extends between the adjacent picture elements 14 in the direction indicated by the arrow X, extends toward the central part of the corresponding one of the adjacent picture elements 14. The wider part is referred to as a connection electrode first wide part 56.

Specifically, the connection electrode 54 is widened in the connection electrode first wide part 56 so as to have a lozenge shape (see FIG. 1).

The connection electrode first wide part 56 has the lozenge shape so as to (i) match a shape of the picture element electrode 60 and (ii) widen the connection electrode while suppressing a reduction in aperture ratio.

Specifically, as described earlier, the picture element electrode 60 has the slits 62 in the liquid crystal display device 10 of the present embodiment. The connection electrode first wide part 56 is adjacent to the third alignment region R3 and to the fourth alignment region R4. The third alignment region R3 has slits 62 each of which extends at an angle of approximately +45 with the direction indicated by the arrow X. On the other hand, the fourth alignment region R4 has slits 62 each of which extends at an angle of approximately −45 degrees with the direction indicated by the arrow X. Since the directions of the slits 62 are different in the adjacent alignment regions R3 and R4, there exists a dead space, which has a triangular shape and is difficult to be efficiently used.

The dead space exists also in a neighboring picture element 14 which is provided in the direction indicated by the arrow Y. Therefore, such two dead spaces caused by the adjacent picture elements 14 make up the lozenge shape.

Note here that the connection electrode 54 is generally made of metal that has a light-shielding property. The dead space does not at all contribute to a display or may contribute to a display with low quality. Therefore, even if the connection electrode first wide part 56 is secured in the dead space, it is possible to suppress a reduction in aperture ratio etc.

Meanwhile, the connection electrode first wide part 56 serves as the storage capacitor counter electrode 40. Accordingly, the larger area the connection electrode first wide part 56 has, the greater storage capacitor can be formed. This will be described below.

That is, as described earlier, the connection electrode 54 and the storage capacitor line 36 overlap each other, when viewed from above, in the area between the adjacent picture elements 14. This makes it possible to form a storage capacitor between the connection electrode 54 (storage capacitor counter electrode 40) and the storage capacitor line 36.

Further, the storage capacitor line 36 is also widened in an area where the storage capacitor line 36 and the connection electrode first wide part 56 overlap each other when viewed from above. That is, the storage capacitor line 36 has a storage capacitor line first wide part, which has a shape substantially identical to that of the connection electrode first wide part 56.

As such, as described earlier, it is possible to increase storage capacitor without reducing, not that much, the aperture ratio etc. of the connection electrode first wide part 56 (which serves as the storage capacitor counter electrode 40) and the storage capacitor line first wide part 38.
(Second Wide Part)

The connection electrode 54 and the storage capacitor line 36 extend, in the direction indicated by the arrow Y, toward the central part of the picture element 14 from the connection electrode first wide part 56 and the storage capacitor line first wide part 38, respectively.

Specifically, the connection electrode 54 and the storage capacitor line 36 extend, in the fourth border region R14 between the third alignment region R3 and the fourth alignment region R4, so as to reach the border central region R20.

The connection electrode 54 and the storage capacitor line 36 overlap each other, when viewed from above, in the fourth border region R14 where the connection electrode 54 and the storage capacitor line 36 extend. This makes it possible to form a storage capacitor, in the fourth border region R14, between the connection electrode 54 and the storage capacitor line 36.

Moreover, as is the case with the earlier-described dead space in which the first wide part is provided, the fourth border region R14 does not at all contribute to a display or may contribute to a display with low quality. Therefore, even if the connection electrode 54 and the storage capacitor line 36 extend in the fourth border region R14, it is possible to suppress a reduction in aperture ratio etc.
(Second Wide Part)

The connection electrode 54 and the storage capacitor line 36, each of which extends in the fourth border region R14 so as to reach the border central region R20, are widened in the border central region R20 (see FIG. 1).

Specifically, the connection electrode 54 has a widened part, i.e., a connection electrode second wide part 57, and the storage capacitor line 36 has a widened part, i.e., a storage capacitor line second wide part 39.

As is the case with the connection electrode first wide parts, the connection electrode second wide part 57 and the storage capacitor line second wide part 39 have a substantially identical shape, and overlap each other when viewed from above.

Note here that the connection electrode second wide part 57 serves also as the storage capacitor counter electrode 40. This causes a storage capacitor to be formed by the connection electrode second wide part 57 and the storage capacitor line second wide part 39. As such, it is possible to increase storage capacitor.

Further, the border central region R20 does not at all contribute to a display or may contribute to a display with low quality. Therefore, even if the connection electrode second wide part 57 and the storage capacitor line second wide part 39 are secured in the border central region R20, it is possible to suppress a reduction in aperture ratio etc.

Furthermore, in a case where the border regions such as the border central region R20 are inferior in the display quality to the other regions, provision of the storage capacitor line 36 and the connection electrode 54, which are generally made of metal that has a light-shielding property, in the border regions makes it possible to suppress a reduction in display quality of the liquid crystal display device 10 as a whole.
(Contact Hole)

In the border central region R20, the connection electrode 54 and the picture element electrode 60, which are provided on respective different layers via an insulation film (not illustrated), are electrically connected with each other.

Specifically, there is provided a contact hole 58 that penetrates the insulation film. The connection electrode 54 and the picture element electrode 60 are connected with each other via the contact hole 58. This causes an electrical connection between the picture element electrode 60 and the switching element 50. More specifically, the drain electrode 52 of the TFT element which serves as the switching element 50 is connected with the picture element electrode 60.

(Black Matrix)

Next, the following description discusses a black matrix. In the liquid crystal display device 10 of the present embodiment, a black matrix 88 is provided on a second substrate.

The black matrix 88 is provided so as to cover, when viewed from above, the switching element 50, the border central region R20, and an area between adjacent picture elements 14.

This will be specifically described below with reference to cross-sectional views.

(Cross-Sectional Structure)

FIG. 2 is a cross-sectional view taken along line A-A of FIG. 1. The following description discusses, with reference to FIG. 2, a cross-sectional structure etc. of the liquid crystal display device 10 in accordance with the present embodiment.

The liquid crystal display device 10 of the present embodiment includes (i) two substrates (a first substrate 22 and a second substrate 24) that face each other and (ii) a liquid crystal material that contains liquid crystal molecules and serves as a liquid crystal layer 26 (see FIG. 2 that schematically illustrates how a cross-sectional surface of the liquid crystal display device 10 is configured). The liquid crystal layer 26 is sandwiched between the first substrate 22 and the second substrate 24.

The liquid crystal display device 10 further includes columnar spacers (not illustrated) so as to control a gap between the first substrate 22 and the second substrate 24. Specifically, the columnar spacers such as photo spacers (PS) are provided to the second substrate 24.

The columnar spacers are provided in areas, which do not contribute to a display, such as in the vicinities of four corners of the picture element 14 in a rectangular shape such that the columnar spacers and the picture element electrode 60 do not overlap each other when viewed from above.

It is preferable to secure a gap of, for example, 3 μm or greater (as a design value) between each of the columnar spacers and the picture element electrode 60. This is because (i) it is necessary to secure a distance designed and found by taking into consideration (a) a margin for displacement that occurs when the first substrate 22, on which TFTs are provided (on which array is provided), and the second substrate 24, on which a color filter is provided, are combined with each other and (b) finish variations and (ii) an alignment abnormality may occur if the columnar spaces such as the photo spacers make contact with the pixel electrode. The alignment abnormality may occur mainly because of an electric field distortion caused by a difference between dielectric constants of a PS material and the liquid crystal material.

(First Substrate)

Next, the following description more specifically discusses the first substrate 22, which is a so-called array-side substrate. On the first substrate 22, the scanning signal lines 32 and the storage capacitor lines 36 are provided. On the scanning signal line 32 and the storage capacitor line 36, there is provided a gate insulation film 72 that serves as an insulation film 70.

On the gate insulation film 72, the connection electrode 54 that serves as the storage capacitor counter electrode 40 is provided in a region where the connection electrode 54 and the storage capacitor line 36 overlap each other when viewed from above.

Above the storage capacitor counter electrode 40, the picture element electrode 60 is provided, via a first inter-layer insulation film 70b and a second inter-layer insulation film 70c, each of which serves as the insulation film 70.

An alignment film 112 is provided on the picture element electrode 60, and the surface of the alignment film 112 is in contact with one surface of the liquid crystal layer 26.

Both the scanning signal line 32 and the storage capacitor line 36 are made of so-called G layer (gate layer) metal M1, and are provided in a single layer above the first substrate 22. An example of the G layer metal M1 is TiN/Ti/Al or the like.

The storage capacitor counter electrode 40 is made of so-called S layer (source layer) metal M2, and is provided, above the first substrate 22, in a layer in which the image signal line 34 is provided. An example of the S layer metal M2 is Mo/MoN/Al/MoN or the like.

The insulation film 70 such as the first inter-layer insulation film 70b, which serves as an insulating material, is not limited to a specific material, provided that it has an insulation property. The insulation film 70 can be constituted by, for example, (i) a single-layer inorganic film, (ii) a single-layer organic film, or (iii) a two-layer film made up of organic and inorganic films.

(Second Substrate)

Next, the following description discusses the second substrate.

The second substrate 24 is a so-called color filter side substrate. On the second substrate 24, the black matrix 88 is provided so as to correspond to the picture elements. Further, color filters 80 for respective colors (a red color filter 80R, a green color filter 80G, and a blue color filter 80B) are provided on the second substrate 24. On the color filters 80, a common electrode 90 is provided.

On the common electrode 90, an alignment film 114 is provided, and the surface of the alignment film 114 is in contact with the other surface of the liquid crystal layer 26.

(Contact Hole)

Next, the following description discusses the contact hole 58 of the present embodiment. The contact hole 58 is in the border central region R20 so as to electrically connect the connection electrode 54 and the picture element electrode 60, which are provided via the first inter-layer insulation film 70b and the second inter-layer insulation film 70c. Specifically, the contact hole 58 penetrates the first inter-layer insulation film 70b and the second inter-layer insulation film 70c. On an inner wall of the contact hole 58, there is provided an electrically conductive layer made of for example a material identical to that of the picture element electrode 60.

(Black Matrix)

The black matrix 88 is provided on the second substrate 24 so that the black matrix 88 covers the contact hole 58 when viewed from above. More specifically, the black matrix 88 is provided so that the black matrix 88 covers the entire border central region R20, in which there are provided the storage capacitor line second wide part 39, the connection electrode second wide part 57, and the bypass part of the scanning signal line 32.

Further, the black matrix 88 is provided, in an area between any of respective picture elements 14 that are adjacent to each other via a corresponding storage capacitor line 36, so as to cover an area between any of respective adjacent picture element electrodes 60.

Further, the black matrix 88, which is provided in an area between any of respective adjacent picture element electrodes 60, covers, when viewed from above, edges of picture element electrodes 60 for any of respective adjacent picture elements 14. That is, edges of the branch line regions 64 of each of the picture element electrodes 60 are covered by the black matrix 88 when viewed from above.

With the configuration, it is possible to shield the edges of the branch line regions 64, in which edges a reduction in display quality is likely to occur. This makes it possible to prevent a reduction in display quality.

Note here that the switching elements (not illustrated) are also covered by the black matrix 88.

(Relative Positions of Electrodes)

Next, the following description discusses, with reference to FIG. 3 which is a cross-sectional view taken along line B-B of FIG. 1, how the electrodes are arranged in the present embodiment.

As illustrated in FIG. 3, in an area between the picture elements 14 that are adjacent to each other via the storage capacitor line 36, (i) the storage capacitor line 36 and (ii) the connection electrode 54 that serves as the storage capacitor counter electrode 40 partially overlap each other, i.e., do not exactly overlap each other when viewed from above.

Further, (i) each of the storage capacitor line 36 and the connection electrode 54 and (ii) each of the picture element electrodes 60a and 60b that correspond to the respective adjacent picture elements 14 partially overlap each other, i.e., do not exactly overlap each other. These will be described below.

(Connection Electrode and Storage Capacitor Line)

First, the following description discusses how the connection electrode 54 and the storage capacitor line 36 are arranged.

It is assumed that one of the adjacent picture element electrodes 60 that is connected to the connection electrode 54 which is located in an area between the adjacent picture elements 14 is referred to as a reference picture element electrode 60a, and the other of the adjacent picture element electrodes 60 that is not connected to the connection electrode 54 is referred to as a neighboring picture element electrode 60b.

The connection electrode 54 and the storage capacitor line 36 overlap each other such that the connection electrode 54 protrudes, on the reference picture element electrode 60a side, from the storage capacitor line 36 toward the reference picture element electrode 60a when viewed from above (see D2 of FIG. 3).

On the other hand, the storage capacitor electrode 36 protrudes, on the neighboring picture element electrode 60b side, from the connection electrode 54 toward the neighboring picture element electrode 60b when viewed from above (see D4 of FIG. 3).

(Connection Electrode and Picture Element Electrode)

Next, the following description discusses how the connection electrode 54 and the picture element electrode 60 are arranged.

The connection electrode 54 and the reference picture element electrode 60a are arranged so as to overlap each other via the insulation film 70 when viewed from above (see D1 of FIG. 3).

On the other hand, the connection electrode 54 and the neighboring picture element electrode 60b are arranged so as not to overlap each other via the insulation film 70 when viewed from above (see D3 of FIG. 3).

Note, however, that the connection electrode 54 and the neighboring picture element electrode 60b can be arranged so as to overlap each other when viewed from above. In this case, it is preferable that D3<D1, where D3 is a width of an area where the connection electrode 54 and the neighboring picture element electrode 60b overlap each other.

According to the present embodiment, a connection electrode 54 is thus displaced, in an area between any of respective adjacent picture elements 14, so as to be closer to a corresponding reference picture element electrode 60a than to a corresponding neighboring picture element electrode 60b.

According to the arrangement, it is difficult for an electric potential of the storage capacitor line 36 to affect an electric potential of the reference picture element electrode 60a. This is because the connection electrode 54 serves as a plate that shields against an electric field. Since it is difficult for the storage capacitor line 36 to affect the reference picture element electrode 60a, it is possible to prevent a reduction in display quality of the picture element that corresponds to the reference picture element electrode 60a.

Further, according to the arrangement, it is difficult for an electric potential of the connection electrode 54 to affect an electric potential of the neighboring picture element electrode 60b. This is because the storage capacitor line 36 prevents the electric field, which is generated from the connection electrode 54, from reaching the neighboring picture element electrode 60b. Since it is difficult for the connection electrode 54 to affect the neighboring picture element electrode 60b, it is possible to prevent a reduction in display quality of the picture element 14 that corresponds to the neighboring picture element electrode 60b.

(Main Line Region and Scanning Signal Line)

Next, the following description discusses, with reference to FIG. 3, how (i) a main line region 66 of the picture element electrode 60 and (ii) the scanning signal line 32 are arranged.

As illustrated in FIG. 3, the main line region 66 is provided so as to be greater in width than the scanning signal line 32. Further, as is shown by differences D11 and D12 in FIG. 3, the main line region 66 covers the scanning signal line 32 when viewed from above.

With the configuration, it is possible for the liquid crystal layer 26 to be less affected by the scanning signal line 32. This is because the picture element electrode 60 blocks an electric field that is from the scanning signal line 32. Since the liquid crystal layer 26 is less affected by the scanning signal line 32, it is possible to suppress a reduction in display quality.

Embodiment 2

Figure 4:
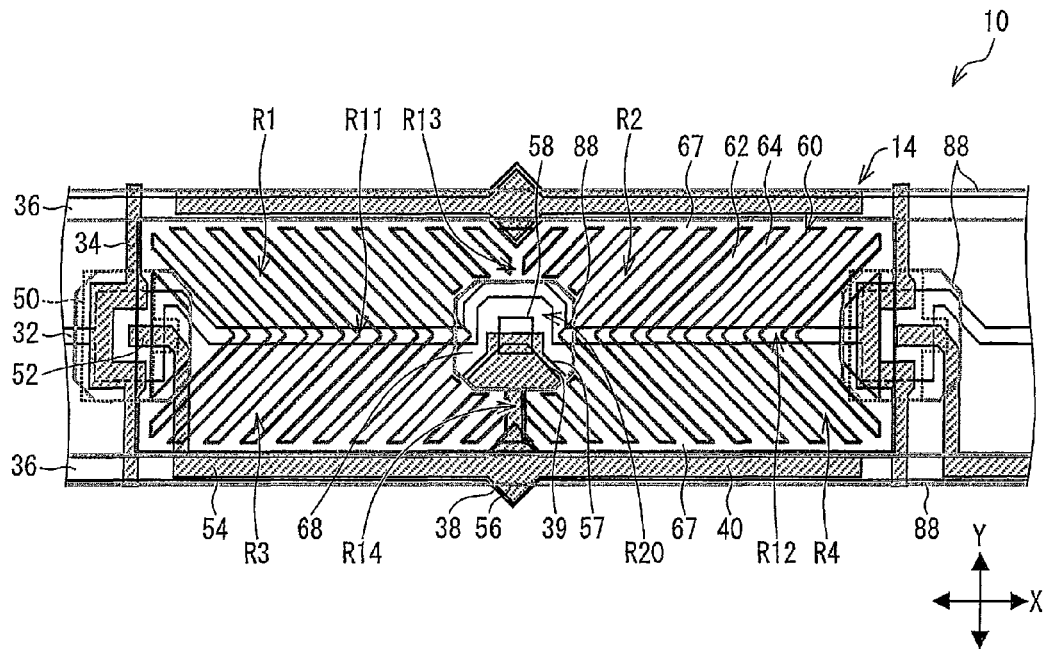
FIG. 4

The following description discusses, with reference to FIG. 4, a second embodiment of the present invention. FIG. 4 schematically illustrates how a liquid crystal display device of another embodiment in accordance with the present invention is configured.

Note here that configurations other than a configuration described in the present embodiment are same as those described in Embodiment 1. For convenience of description, members having functions identical to those illustrated in the drawings of Embodiment 1 are assigned identical referential numerals, and their descriptions are omitted here.

(Peripheral Connection Region)

A liquid crystal display device 10 of the present embodiment is different from the liquid crystal display device of Embodiment 1 in the following point. That is, a picture element electrode 60 of the liquid crystal display device 10 in accordance with the present embodiment has a peripheral connection region 67 in its peripheral part, instead of the main line region 66 (i.e., the first main line region 66a and the second main line region 66b) which extends in the direction indicated by the arrow X.

Specifically, according to Embodiment 1, the slits 62 in the first alignment region R1 and the slits 62 in the third alignment region R3 are separated from each other, and therefore do not communicate with each other. In view of the circumstances, the first main line region 66a is provided between (i) the slits 62 in the first alignment region R1 and (ii) the slits 62 in the third alignment region R3.

Further, according to the liquid crystal display device 10 in accordance with Embodiment 1, the slits 62 in the second alignment region R2 and the slits 62 in the fourth alignment region R4 do not communicate with each other. In view of the circumstances, the second main line region 66b is provided between (i) the slits 62 in the second alignment region R2 and (ii) the slits 62 in the fourth alignment region R4.

In contrast, according to the liquid crystal display device 10 of the present embodiment, slits 62 in a first alignment region R1 communicate with respective slits 62 in a third alignment region R3, but a direction in which the slits 62 extend in the first alignment region R1 is different from a direction in which the slits 62 extend in the third alignment region R3, as is the case with Embodiment 1.

Further, (i) branch line regions 64 of the picture element electrode 60 in the first alignment region R1 and (ii) branch line regions 64 of the picture element electrode 60 in the third alignment region R3 are electrically connected with each other via the peripheral connection region 67, which is a part of the picture element electrode 60 and is provided in the periphery of a picture element 14, more specifically, in the vicinity of each long side, which extends in a horizontal direction, of the horizontally long picture element.

Similarly, (i) branch line regions 64 of the picture element electrode 60 in the second alignment region R2 and (ii) branch line regions 64 of the picture element electrode 60 in the fourth alignment region R4 are also electrically connected with each other via the peripheral connection region 67.

According to this configuration, there are no ends on the respective branch line regions 64. That is, according to Embodiment 1, the branch line regions 64 have their respective ends in the vicinity of the periphery of the picture element 14. In contrast, according to the present embodiment, the branch line regions 64 do not have their respective ends because the branch line regions 64 are communicated with one another via the peripheral connection region 67.

Note here that the ends of the branch line regions 64 are likely to have respective uneven shapes. The unevenness will partially cause a reduction in display quality. In this regard, as described above, the branch line regions 64 do not have their respective ends in the liquid crystal display device 10 of the present embodiment. Accordingly, it is possible to prevent such a reduction in display quality, which reduction is caused by the unevenness of the shapes of the branch line regions 64.

Embodiment 3

Figure 5:
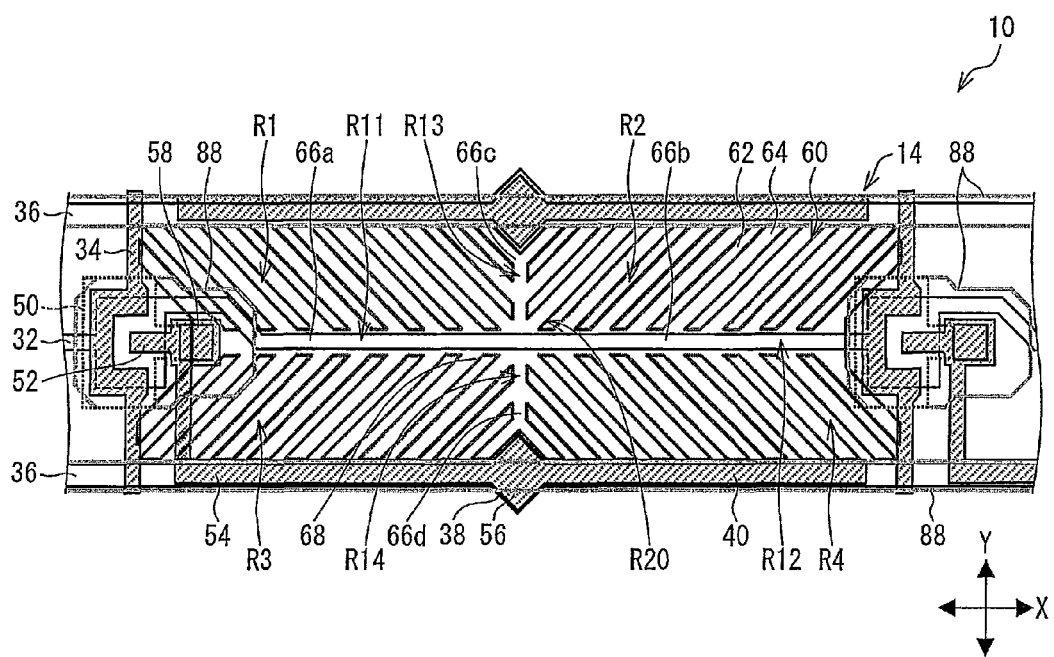
FIG. 5

The following description discusses, with reference to FIG. 5, a third embodiment of the present invention. FIG. 5 schematically illustrates how a liquid crystal display device of a further embodiment of the present invention is schematically configured.

Note here that configurations other than a configuration described in the present embodiment are same as those described in Embodiments 1 and 2. For convenience of description, members having functions identical to those illustrated in the drawings of Embodiments 1 and 2 are assigned identical referential numerals, and their descriptions are omitted here.

A liquid crystal display device 10 in accordance with the present embodiment is characterized in that a contact hole 58, via which a switching element 50 and a corresponding picture element electrode 60 are connected with each other, is not provided in a central part of a picture element 14 but in the vicinity of the switching element 50.

According to Embodiment 1, the switching element 50 and the picture element electrode 60 are connected with each other, in the border central region R20 which is in the central part of the picture element 14, via the connection electrode 54.

In contrast, according to the present embodiment, a contact hole 58 is in the vicinity of a drain electrode 52 of a corresponding TFT element (i.e., a switching element 50). The switching element 50 and the corresponding picture element electrode 60 are connected with each other in the vicinity of the switching element 50, via the contact hole 58.

According to the present embodiment, it is not necessary to cause the connection electrode 54 to extend, in a vertical direction that is indicated by the arrow Y, from a border area of a neighboring picture element 14. Specifically, it is not necessary to cause the connection electrode 54 to extend, for example, in the fourth border region R14. This makes it unnecessary to cause a storage capacitor line 36 to extend in the vertical direction. This is because, even if the storage capacitor line 36 is extended, the connection electrode 54 that serves as a storage capacitor counter electrode 40 is not extended. It follows that no storage capacitor will never be formed.

Further, it is not necessary to provide, in the border central region R20, a central connection region 68 which is a solid region of the picture element electrode 60. This is because it is not necessary to provide the contact hole 58 in the border central region R20.

Since the liquid crystal display device 10 of the present embodiment is configured as above, it is possible to increase the aperture ratio, thereby increasing an area size of a display region. This is because the connection electrodes 54 and the storage capacitor line 36, which are electrodes having a light-shielding property and are provided in the picture element 14, occupy smaller area.

Furthermore, according to the present embodiment, a scanning signal line 32 is not bent in a U shape in the central part of the picture element 14, but is extending straight through the central part. This is because, since no contact hole 58 is provided in the central part of the picture element 14, it is unnecessary for the scanning signal line 32 to bypass the contact hole 58.

Note that, according to the configuration illustrated in FIG. 5, as is the case with Embodiment 1 shown in FIG. 1, the connection electrode 54 is provided in an area between the adjacent picture elements 14 such that the connection electrode 54 and the storage capacitor line 36 overlap each other when viewed from above.

Figure 6:
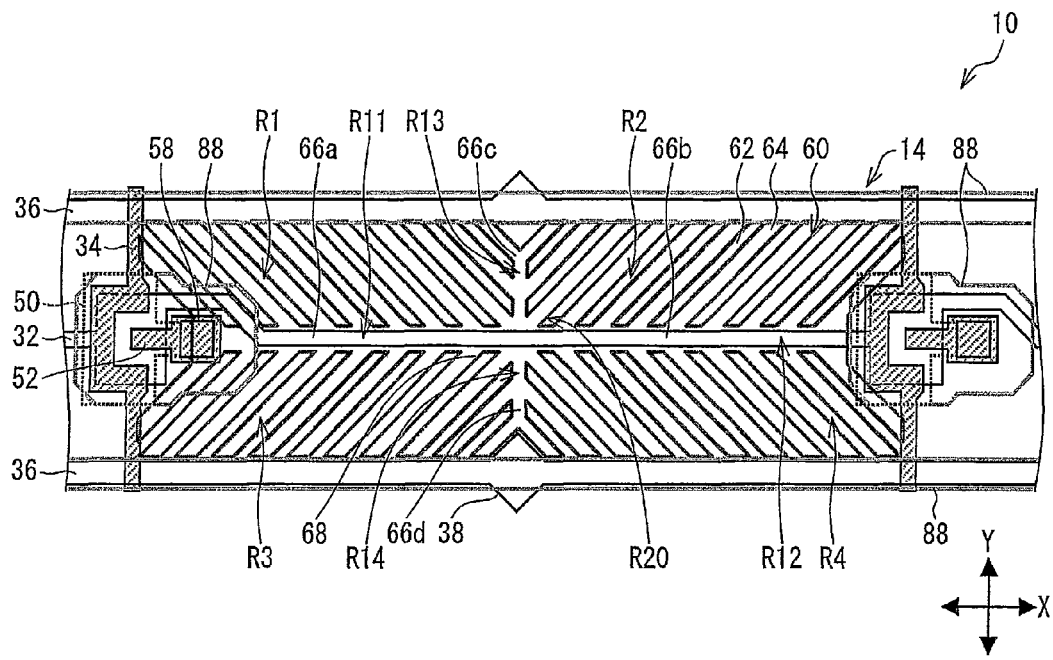
FIG. 6

Note here that the present embodiment does not necessarily provide the connection electrode 54. Namely, it is possible to omit a connection electrode 54, for example, as shown in FIG. 6 that illustrates still a further configuration of the liquid crystal display device 10.

This is because, according to the present embodiment, the connection electrode 54, which extends from an output terminal (i.e., the drain electrode 52) of the switching element 50, does not have to be extended toward the central part of the picture element 14.

Embodiment 4

Figure 7:
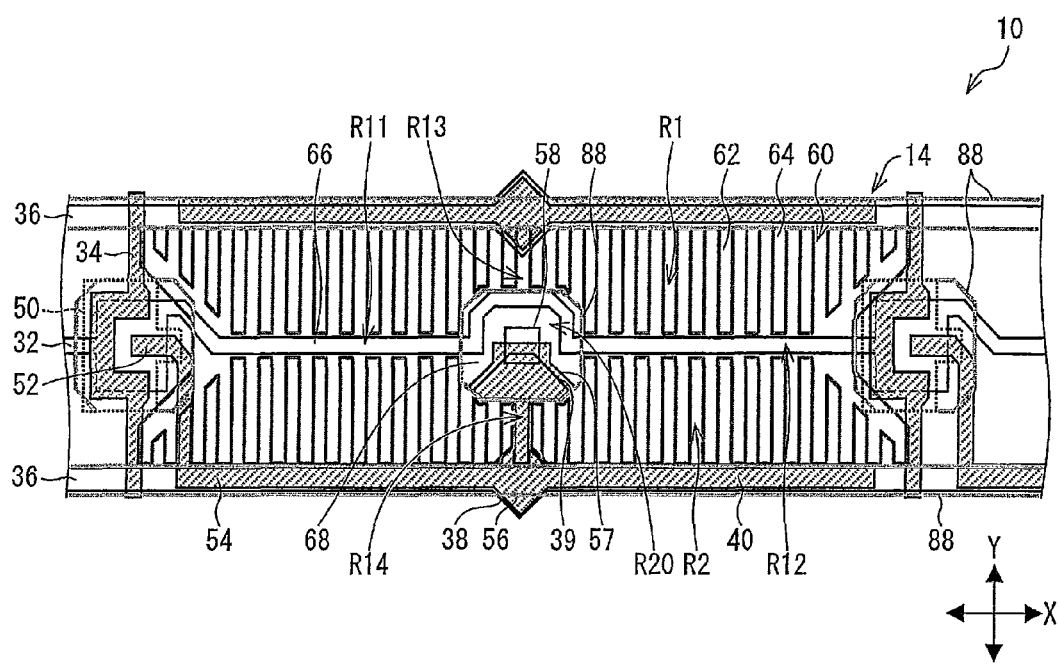
FIG. 7

The following description discusses, with reference to FIG. 7, a fourth embodiment of the present invention. FIG. 7 schematically illustrates how a liquid crystal display device of still yet a further embodiment of the present invention is configured.

Note here that configurations other than a configuration described in the present embodiment are same as those described in Embodiments 1 through 3. For convenience of description, members having functions identical to those illustrated in the drawings of Embodiments 1 through 3 are assigned identical referential numerals, and their descriptions are omitted here.

A liquid crystal display device 10 of the present embodiment is different from the liquid crystal display device 10 of Embodiment 1 in that the number of alignment regions is two.

That is, according to the liquid crystal display device 10 of Embodiment 1, the picture element 14 has the four alignment regions in total: two in the direction indicated by the arrow X and two in the direction indicated by the arrow Y. In contrast, according to the liquid crystal display device 10 of the present embodiment, a picture element 14 has two alignment regions in total. Specifically, a horizontally long picture element 14 is divided into two alignment regions (i.e., a first alignment region R1 and a second alignment region R2) by a line parallel with the direction indicated by the arrow X.

Accordingly, a border region, provided in the direction indicated by the arrow X, causes a division into two border regions, i.e., a first border region R11 and a second border region R12. Each of the first border region R11 and the second border region R12 extends toward a border central region R20. There is no border region that extends in the direction indicated by the arrow Y.

Further, a picture element electrode 60 has slits 62, as is the case with Embodiment 1. The slits 62 of the picture element electrode 60 in each of the alignment regions extend in parallel with one another.

FIG. 7 illustrates an exemplary configuration in which the slits 62 in the first alignment region R1 extend in a direction identical to a direction in which and the slits 62 in the second alignment region R2 extend. Note, however, that the directions in the respective first and second alignment regions R1 and R2 are not limited to respective such directions.

The picture element electrode 60 has, in its regions that correspond to the first border region R11 and the second border region R12, a main line region 66 via which the branch line regions 64 in the alignment regions R1 and R2 are electrically connected with each other.

According to the present embodiment, a scanning signal line 32 is provided, as is the case with Embodiment 1, in regions that correspond to the first border region R11 and the second border region R12. The scanning signal line 32 is provided so as to be covered, when viewed from above, by the main line region 66.

Industrial Applicability

The present invention is, in particular, suitably applicable to a liquid crystal display device, such as a mobile phone, a PDA (personal digital assistant), a personal navigation system, or a portable game device, that is relatively small and is desired to achieve a high quality display with low power consumption.

The invention claimed is:

1. A liquid crystal display device, comprising:
a first substrate;
a second substrate; and
a liquid crystal layer provided between the first substrate and the second substrate,
picture elements being provided in a matrix manner,
the first substrate being provided with:
a plurality of scanning signal lines;
a plurality of image signal lines which are provided so as to intersect the plurality of scanning signal lines;
a plurality of switching elements each of which is electrically connected with a corresponding one of the plurality of scanning signal lines and electrically connected with a corresponding one of the plurality of image signal lines; and picture element electrodes which are provided so as to correspond to the respective picture elements and so as to be electrically connected with the respective switching elements,
the second substrate being provided with a common electrode,
each of the picture element electrodes having (i) a first side that extends in a direction in which a corresponding one of the plurality of scanning signal lines extends and (ii) a second side that extends in a direction in which a corresponding one of the plurality of image signal lines extends, the first side being longer than the second side,
each of the picture elements having a plurality of alignment regions, in each of which liquid crystal molecules contained in the liquid crystal layer are aligned in a direction that is different from those in the others of the plurality of alignment regions, and
each scanning signal line of said plurality of scanning signal lines is associated with a corresponding picture element of said picture elements, and
(i) said scanning signal line and
(ii) a border region between corresponding adjacent ones of the plurality of alignment regions which belong to said corresponding picture element that corresponds to said scanning signal line,
at least partially overlap each other when viewed from above.

2. The liquid crystal display device according to claim 1, wherein the first substrate is further provided with:
storage capacitor lines which are provided so as to extend in a direction parallel to the direction in which the plurality of scanning signal lines extend,
a major part of each of the storage capacitor lines is provided between corresponding adjacent ones of the picture element electrodes, the corresponding adjacent ones of the picture element electrodes being adjacent to each other in a direction in which the plurality of image signal lines extend, and
said each of the storage capacitor lines and the corresponding adjacent ones of the picture element electrodes at least partially overlapping one another via an insulation film when viewed from above.

3. The liquid crystal display device according to claim 2, wherein the first substrate is further provided with:
connection electrodes via which the plurality of switching elements are electrically connected with the respective picture element electrodes,
the connection electrodes and the respective storage capacitor lines at least partially overlapping each other via the insulation film when viewed from above.

4. The liquid crystal display device according to claim 3, wherein, in areas where the connection electrodes and the respective storage capacitor lines overlap each other when viewed from above,
the connection electrodes and respective reference picture element electrodes overlap each other via the insulation film when viewed from above, the reference picture element electrodes being ones which are connected with the respective connection electrodes,
the storage capacitor lines and the respective reference picture element electrodes overlap each other via the insulation film when viewed from above,
the connection electrodes are provided in a layer which is closer to the reference picture element electrodes than a layer in which the storage capacitor lines are provided is; and areas where the connection electrodes and the reference picture element electrodes overlap each other is larger than areas where the storage capacitor lines and the reference picture element electrodes overlap each other.

5. The liquid crystal display device according to claim 1, wherein the first substrate is further provided with:
   connection electrodes via which the plurality of switching elements are electrically connected with the respective picture element electrodes,
   the plurality of alignment regions whose total number is four being provided in each of the picture elements so as to be divided into (i) first two regions adjacent to each other in a direction parallel to the direction in which the plurality of scanning signal lines extend and (ii) second two regions adjacent to each other in a direction parallel to the direction in which the plurality of image signal lines, and
   each contact hole for electrically connecting a corresponding one of the connection electrodes with a corresponding one of the picture element electrodes being provided in an area of a corresponding one of the picture elements, in which area (i) two border regions each between two alignment regions which are adjacent to each other in the direction in which the plurality of scanning lines extend and (ii) two border regions each between two alignment regions which are adjacent to each other in the direction in which the plurality of image signal lines extend intersect each other.

6. The liquid crystal display device according to claim 5, wherein the each contact hole and a corresponding one of the plurality of scanning signal lines do not overlap each other when viewed from above.

7. The liquid crystal display device according to claim 5, wherein the second substrate is further provided with:
   a black matrix,
   the contact holes being covered by the black matrix when viewed from above.

8. The liquid crystal display device according to claim 5, wherein:
   a major part of each of the connection electrodes is provided between corresponding adjacent ones of the picture element electrodes, the corresponding adjacent ones of the picture element electrodes being adjacent to each other in a direction in which the plurality of image signal lines extend; and
   each of the connection electrodes extends from an area between corresponding adjacent ones of the picture element electrodes to the contact hole, when viewed from above, via a corresponding one of the two border regions each between the two alignment regions which are adjacent to each other in the direction in which the plurality of scanning lines extend.

9. The liquid crystal display device according to claim 1, wherein:
   each of the picture element electrodes has at least two slits in each of the plurality of alignment regions;
   a direction in which said at least two slits extend differs from alignment region to alignment region; and
   said at least two slits of said each of the picture element electrodes extend in an identical direction in each of the plurality of alignment regions.

10. The liquid crystal display device according to claim 9, wherein:
    each of the picture element electrodes has, in each of the plurality of alignment regions, a comb-teeth shape since it has said at least two slits;
    said each of the picture element electrodes has a main line region via which branch line regions in the plurality of alignment regions are electrically connected with one another; and
    the main line region and a corresponding one of the plurality of scanning signal lines at least partially overlap each other via the insulation film when viewed from above.

11. The liquid crystal display device according to claim 10, wherein the corresponding one of the plurality of scanning signal lines is covered by the main line region when viewed from above.

12. The liquid crystal display device according to claim 1, wherein the second substrate is further provided with:
    columnar spacers, for keeping a gap between the first substrate and the second substrate, which are provided so that the columnar spacers and the picture element electrodes do not overlap one another when viewed from above.

* * * * *